US006644828B2

(12) United States Patent
Kinouchi

(10) Patent No.: US 6,644,828 B2
(45) Date of Patent: Nov. 11, 2003

(54) VEHICULAR HEADLAMP

(75) Inventor: Toshiyuki Kinouchi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/957,220

(22) Filed: Sep. 20, 2001

(65) Prior Publication Data

US 2002/0039289 A1 Apr. 4, 2002

(30) Foreign Application Priority Data

Sep. 27, 2000 (JP) .................................... P.2000-294361

(51) Int. Cl.[7] ............................ F21V 13/10; B60Q 1/04

(52) U.S. Cl. ........................ 362/214; 362/516; 362/539

(58) Field of Search ................................ 362/211, 214, 362/215, 509, 516, 539, 517, 518, 538

(56) References Cited

U.S. PATENT DOCUMENTS 1,280,626 A * 10/1918 Ames, Jr. .................. 362/214
2,277,685 A * 3/1942 Bergstrom .................. 362/214
5,008,781 A * 4/1991 Nino .......................... 362/215
5,055,981 A 10/1991 Nino .......................... 362/539
5,111,368 A * 5/1992 Suzuki et al. ............... 362/214
5,130,900 A 7/1992 Makita ....................... 362/517
5,430,623 A 7/1995 Uchida ....................... 362/517
5,671,995 A 9/1997 Serizawa et al. ........... 362/510
5,971,575 A 10/1999 Matubara .................... 362/510

* cited by examiner

*Primary Examiner*—Alan Cariaso
(74) *Attorney, Agent, or Firm*—Fish & Richardson P.C.

(57) ABSTRACT

A vehicular headlamp includes a bulb with two filaments disposed one behind the other, a bulb internal shade provided in the vicinity of the front filament, and a reflector for reflecting light produced by the filaments. The reflector includes an upper part and a lower part. A bulb external shade is provided outside the bulb. The bulb internal shade prevents light produced by the front filament from entering into the lower reflector part, and the bulb external shade prevents light produced by the rear filament from entering into the upper reflector part.

5 Claims, 4 Drawing Sheets

VEHICULAR HEADLAMP

BACKGROUND OF THE INVENTION

The present invention relates to a vehicular headlamp such as a headlamp and an auxiliary lamp.

In recent years, vehicles have been developed with a large number of auxiliary lamps in combination with a headlamp to improve safety. The auxiliary lamps are used to change the light distribution when the vehicle is traveling at high speed, around curves, or in the rain. At high speed, the auxiliary lamps are used to illuminate substantially the same range illuminated by the headlamp. Around curves, the auxiliary lamps illuminate diagonally ahead on both sides. In the rain, the auxiliary lamps mainly illuminate a shoulder and white lines of a centerline.

However, providing a large number of auxiliary lamps takes up space and raises costs.

A vehicular headlamp of the present invention can provide various light distributions of a large number of lamps with only a small number of lamps.

SUMMARY OF THE INVENTION

According to one embodiment of the invention, a vehicular headlamp comprises a bulb in which two filaments are disposed one behind the other and a reflector that reflects the light produced by the filaments. The reflector includes two reflector parts having different applications, a shade that prevents the light produced by one filament from entering into one reflector part, and a shade that prevents the light produced by the other filament from entering into the other reflector part. Consequently, one lamp can have dual applications.

In another embodiment, a vehicular headlamp comprises a bulb in which two filaments are disposed one behind the other and a bulb internal shade is provided in the vicinity of a front filament and a reflector that reflects the light produced by the filaments. The reflector includes upper and lower reflector parts having different applications, and a bulb external shade disposed outside the bulb. The bulb internal shade prevents the light produced by the front filament from entering into one of the reflector parts and the bulb external shade prevents the light produced by the rear filament from entering into the other reflector part.

According to still another embodiment, the bulb internal shade is disposed under the front filament and the bulb external shade is disposed above the rear filament. The light reflected by the upper reflector part creates a light distribution that illuminates both sides ahead of a vehicle and the light reflected by the lower reflector part creates a light distribution that illuminates a shoulder or a centerline.

According to yet still another embodiment, the bulb internal shade is disposed under the front filament and the bulb external shade is disposed above the rear filament. The light reflected by the upper reflector part creates a light distribution in which the light substantially condenses and illuminates directly ahead of a vehicle and the light reflected by the lower reflector part creates a light distribution that illuminates both sides ahead of the vehicle.

According to another embodiment, the bulb internal shade is disposed under the front filament and the bulb external shade is disposed above the rear filament. Therefore, the light reflected by the upper reflector part creates a light distribution in which the light substantially condenses and illuminates directly ahead of a vehicle and the light reflected by the lower reflector part creates a light distribution that illuminates a shoulder or a centerline.

DETAILED DESCRIPTION OF THE EMBODIMENTS

The modes for carrying out the invention will hereinafter be described based on the embodiments.

Figure 1:
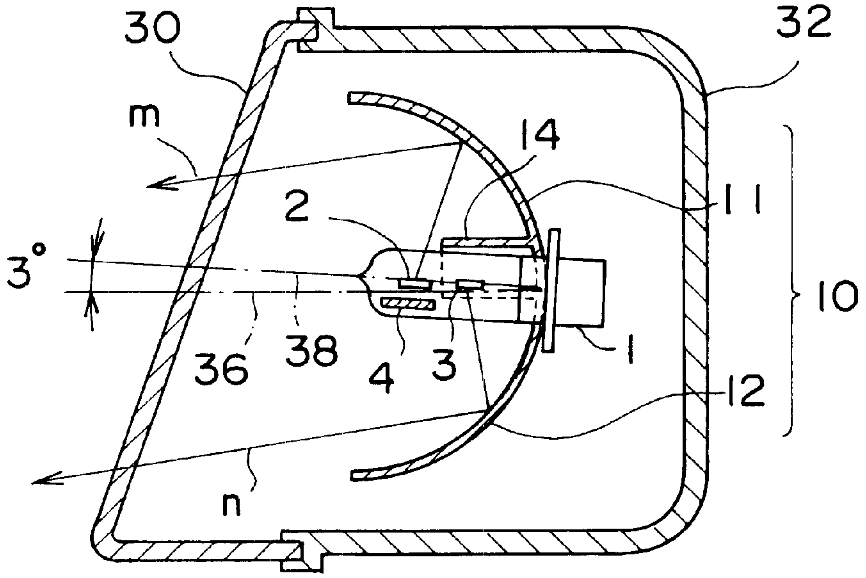
FIG. 1 is a longitudinal sectional view of an auxiliary lamp according to an embodiment of the present invention.
Figure 2:
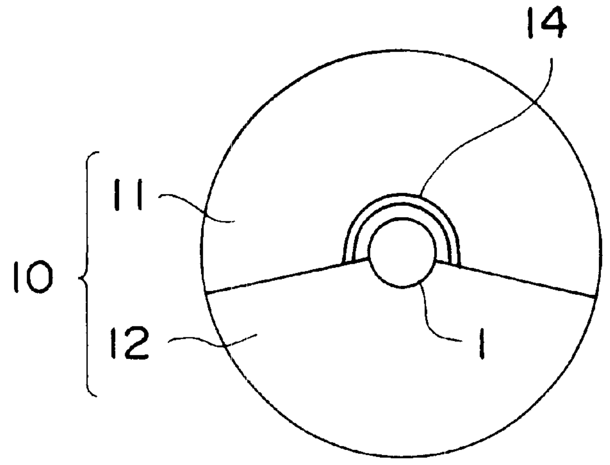
FIG. 2 is an elevation view of a reflector of the auxiliary lamp according to an embodiment of the present invention.
Figure 3:
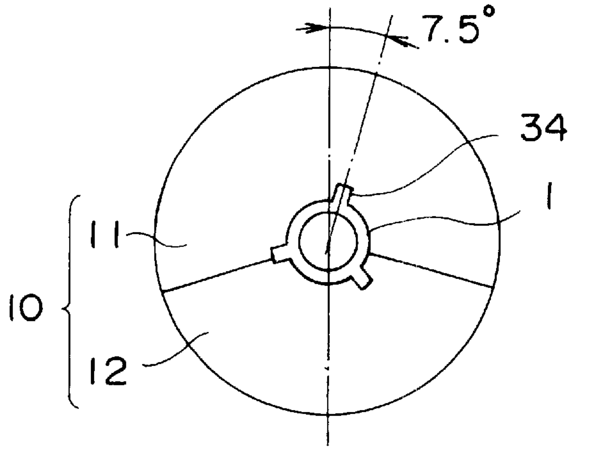
FIG. 3 is a rear view of an H4 bulb fixed to the reflector of the auxiliary lamp according to an embodiment of the present invention.

FIG. 1 shows a longitudinal sectional view of a first embodiment in which the present invention is applied to an auxiliary lamp of a headlamp. The auxiliary lamp according to the embodiment has a reflector 10 fixed in a lamp body 32. A front face of the lamp body 32 is covered with a translucent cover or lens 30. An H4 bulb 1 is fixed to the reflector 10 by means of a fixing element such as a set spring (not shown in the drawings). An elevation view of the reflector 10 is shown in FIG. 2, and a rear view of the H4 bulb 1 fixed to the reflector 10 is shown in FIG. 3.

Figure 4A:
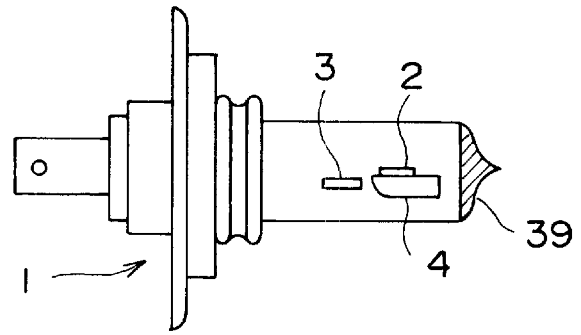
FIG. 4 is a diagram for explaining the use of the H4 bulb: (a) a side view and (b) an elevation view.
Figure 4B:
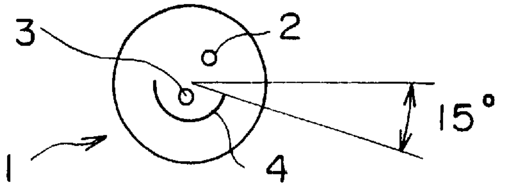

As shown in a side view in FIG. 4(*a*), the H4 bulb 1 has a low-beam filament 2 disposed in front of a high-beam filament 3 and is provided with a bulb internal shade 4 beneath the front low-beam filament 2. A black top 39 on a tip of the bulb 1 is provided to prevent the light from directly going out from both filaments 2, 3. The bulb internal shade 4 is disposed such that either the left or right side is 15° less than the horizontal surface as shown in an elevation view in FIG. 4(*b*).

Therefore, the H4 bulb 1 is fixed to the reflector 10 in a state turned 7.5° about a bulb axis 38 (refer to the position of a reference pin 34 in FIG. 3), such that the light produced by the low-beam filament 2 can be blocked symmetrically. Furthermore, to obtain a horizontal cut line in a screen pattern in FIG. 5 to be mentioned later, the H4 bulb 1 has the bulb axis 38 fixed to the reflector 10 in an upward direction by 3° with respect to a reflector axis 36 to optimize the positional relationship of each filament 2, 3, the bulb internal shade 4, a bulb external shade 14, and the reflector 10.

The reflector 10 that reflects the light produced by each filament 2, 3 is divided into upper and lower halves to comprise an upper reflector part 11 and a lower reflector part 12. The upper reflector part 11 is shaped to provide a light distribution for driving around curves and the lower reflector part 12 is shaped to provide a light distribution for driving in the rain. However, the reflector 10 need not be divided in complete halves. One of the reflector parts may be large and the other may be small in accordance with the particular usage. The amount of light distribution can be controlled according to how the reflector is divided.

Moreover, the bulb external shade 14 is provided above the high-beam filament 3 of the H4 bulb 1 to prevent the light produced by the high-beam filament 3 from entering into the upper reflector part 11. The bulb external shade 14 is semi-cylindrically shaped and the base thereof is fixed to the reflector 10. However, the bulb external shade 14 can be anything that prevents the light produced by the high-beam filament 3 from entering into the upper reflector part 11. For example, a reflecting film or the like may be covered over the surface of the H4 bulb 1.

Figure 5:
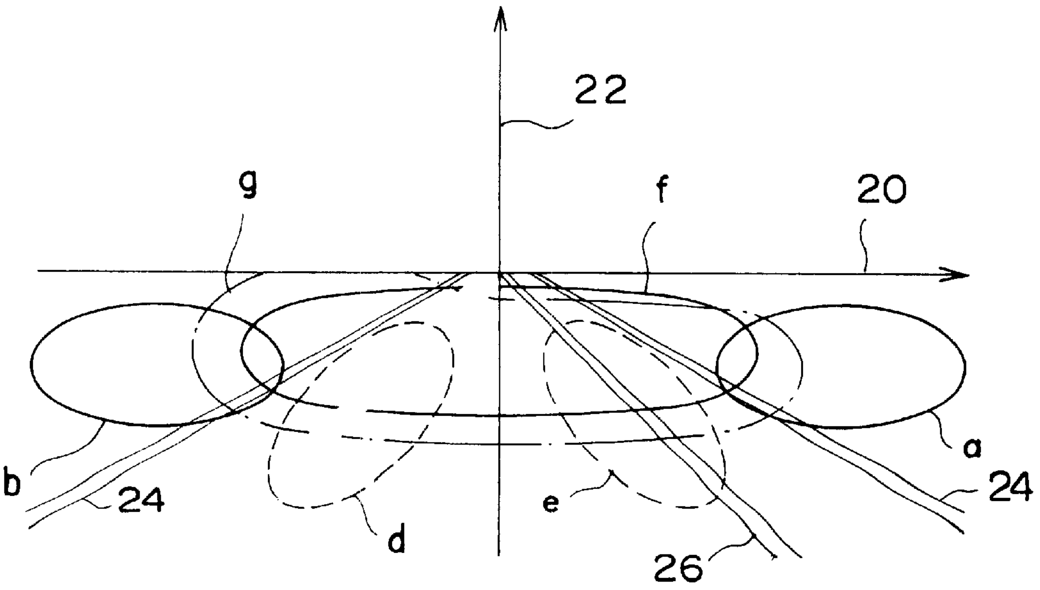
FIG. 5 is a diagram illustrating an illumination range of the auxiliary lamp according to an embodiment of the present invention.
Figure 6:
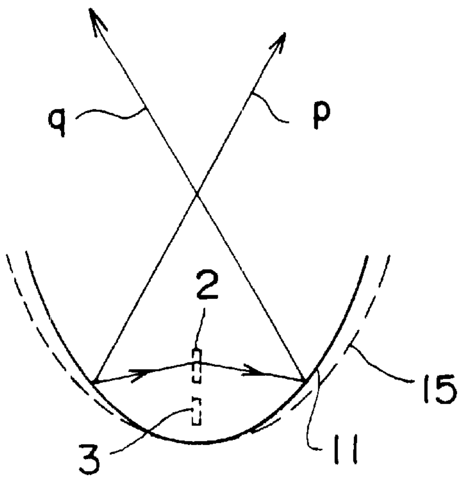
FIG. 6 is a cross-sectional view of a reflector part for driving around curves.

When the front low-beam filament 2 is turned on, a light m only enters into and reflects off the upper reflector part 11 for driving around curves, and does not enter into the lower reflector part 12 because of the bulb internal shade 4. Therefore, as shown in the screen pattern in FIG. 5, a light distribution for driving around curves is obtained that illuminates ranges a, b on both sides ahead of a vehicle, which are located further toward the outside with respect to a range g illuminated by a low beam light distribution of the headlamp. FIG. 5 also shows a horizontal axis 20 and a vertical axis 22 that are references of an illuminating direction of the headlamp. The reflector part 11, as shown in a horizontal sectional view in FIG. 6, has an aperture end curved slightly inward with respect to a paraboloid 15. The reflected lights p, q on the left and right sides of the reflector part 11 cross each other. Accordingly, the light q reflected by the right side of the reflector part 11 illuminates the left range b, and the light p reflected by the left side illuminates the right range a.

On the other hand, when the rear high-beam filament 3 is turned on for driving, for example, in the rain, a light n only enters into and reflects off the lower reflector part 12. The light does not enter into the upper reflector part 11 because of the bulb external shade 14. Therefore, as shown in the screen pattern in FIG. 5, a light distribution is obtained that mainly illuminates ranges d, e in the vicinity of a shoulder 24 and a white line of a center line 26. Accordingly, in this embodiment, one auxiliary lamp can have dual applications, effectively saving space as well as reducing costs. It is also effective in preventing upward glare, since the light irradiated upward from the high-beam filament 3 is blocked by the bulb external shade 14.

A second embodiment of the invention will be described. This embodiment is the same as the first embodiment shown in FIGS. 1, 2, and 3 except that the upper reflector part 11 is shaped to provide a light distribution suitable for high-speed driving and the lower reflector part 12 is shaped to provide a light distribution suitable for driving in the rain.

When the front low-beam filament 2 is turned on, the light m only enters into and reflects off the upper reflector part 11, and does not enter into the lower reflector part 12 because of the bulb internal shade 4. Therefore, as shown in FIG. 5, a light distribution suitable for high-speed driving is obtained that illuminates a range f that substantially overlaps the range g illuminated by the low-beam light distribution of the headlamp. On the other hand, when the rear high-beam filament 3 is turned on, as in the case with the first embodiment, alight distribution suitable for driving in the rain is obtained that mainly illuminates the ranges d, e in the vicinity of the shoulder 24 and the white line of the center-line 26. Consequently, according to the second embodiment as well, one auxiliary lamp can have dual applications, and the same effects obtained with the first embodiment are obtained.

There are various embodiments other than the two mentioned above regarding the combinations of the upper reflector part 11 and the lower reflector part 12. For instance, even if the applications of each reflector part 11, 12 are limited to driving around curves, driving in the rain, and driving in high-speed, the following combinations are possible including the two aforementioned embodiments.

Figure 7:
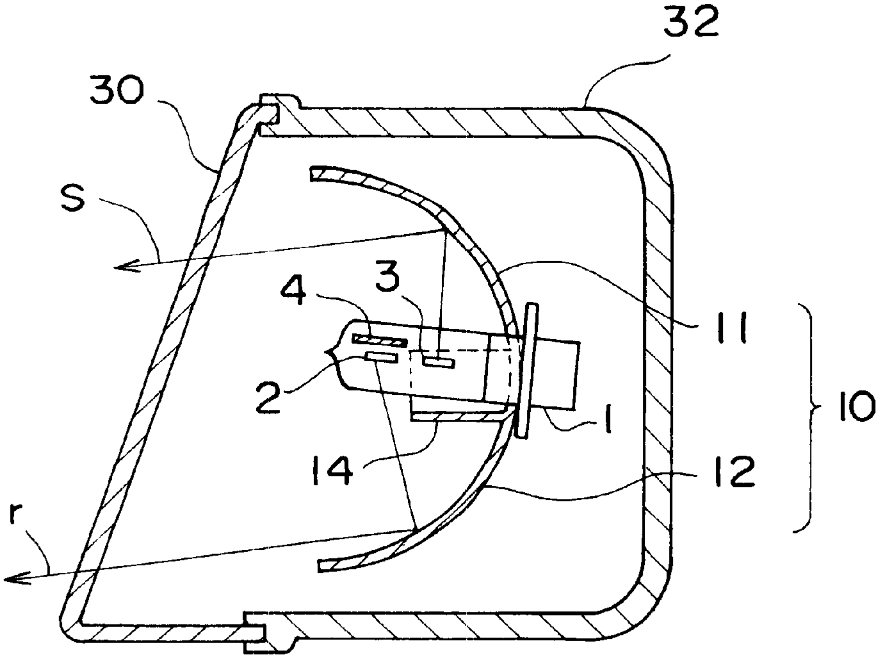
FIG. 7 is a longitudinal sectional view of an auxiliary lamp according to another embodiment of the present invention.

Application of the Upper Reflector Part:

1 For driving around curves
2 For high-speed driving
3 For high-speed driving
4 For driving around curves
5 For driving in the rain
6 For driving in the rain Application of the Lower Reflector Part:

1 For driving in the rain
2 For driving in the rain
3 For driving around curves
4 For high-speed driving
5 For driving around curves
6 For high-speed driving The above combinations are possible when the H4 bulb is rotated 7.5° and fixed to the reflector 10. However, the H4 bulb may be rotated another 180°, that is, rotated 187.5°, and fixed to the reflector 10. Therefore, there are 12 combinations in total, which is twice the number of the aforementioned combinations. When the H4 bulb is rotated 187.5°, as shown in FIG. 7, the bulb internal shade 4 is above the low-beam filament 2, and the bulb external shade 14 is disposed under the high-beam filament 3. In this configuration, when the front low-beam filament 2 is turned on, a light r only enters into the lower reflector part 12, and does not enter into the upper reflector part 11 because of the bulb internal shade 4. On the other hand, when the rear high-beam filament 3 is turned on, a light s only enters into the upper reflector part 11, and does not enter the lower reflector part 12 because of the bulb external shade 14. All else is the same as with each of the aforementioned embodiments and therefore descriptions will be omitted.

Furthermore, for example, when an auxiliary lamp of the combination 2 above is provided on the front right side of the vehicle and an auxiliary lamp of the combination 3 above is provided on the front left side of the vehicle, three light distributions, suitable for driving in high-speed, driving around curves, and driving in the rain, can be obtained with two auxiliary lamps. In this manner, two auxiliary lamps can be used for three applications, and also, just as with the first embodiment, there are space saving and cost reducing effects.

Although a filament of each auxiliary lamp mentioned above may be turned on manually using a switch, it may also be turned on automatically by a controller (not shown). For example, the controller may be connected to a speed sensor, steering sensor, weather sensor, etc., to (1) turn on a filament from which the light enters only into the reflector part for high-speed driving equal to or greater than a predetermined speed, (2) turn on a filament from which the light enters only into the reflector part for driving around curves when a steering wheel is turned equal to or greater than a predetermined amount, or (3) turn on a filament from which the light enters only into the reflector part for driving in the rain when the rain detected is equal to or greater than a predetermined amount.

Moreover, the present invention can be applied not only to auxiliary lamps, but also to headlamps. For example, the use of a headlamp of the combination 2 above and the combination 3 above provides three light distributions, suitable for high-speed driving, driving around curves, and driving in the rain, with two headlamps. In this case, a reflector part of one headlamp suitable for high-speed driving illuminates far away, and a reflector part of the other headlamp suitable for high-speed driving illuminates close in front, and one lamp can be turned off when there is a car coming from the opposite direction.

As described above, it is apparent that according to the invention, various light distributions can be obtained with a small number of lamps just as with the case where a large number of lamps are used, thus saving space and cost.

Several embodiments of the invention have been described herein, but it should be understood that various additions and modifications could be made which fall within the scope of the following claims.

What is claimed is:

1. Vehicular headlamp comprising:

a bulb having two filaments disposed one behind the other;

a reflector for reflecting light produced by the filaments, said reflector being coupled to the bulb and comprising first and second reflector parts;

a first external shade associated with the bulb for preventing light produced by one filament from entering into the second reflector part; and a second internal shade associated with the bulb for preventing light produced by the other filament from entering into the first reflector part, wherein the first external shade is disposed above the one filament and the second internal shade is disposed under the other filament.

2. Vehicular headlamp comprising:

a bulb having front and rear filaments, the front filament disposed in front of the rear filament;

a reflector, coupled to the bulb, for reflecting light produced by the front and rear filaments, said reflector comprising upper and lower reflector parts;

a bulb external shade disposed outside the bulb for preventing light produced by the rear filament from entering into one of the reflector parts; and a bulb internal shade provided in the vicinity of the front filament for preventing light produced by the front filament from entering into the other reflector part, wherein the bulb internal shade is disposed under the front filament and the bulb external shade is disposed above the rear filament.

3. Vehicular headlamp according to claim 2, wherein light reflected by the upper reflector part creates a light distribution that illuminates lateral sides ahead of a vehicle and light reflected by the lower reflector part creates a light distribution that illuminates a shoulder or a centerline.

4. A vehicular headlamp according to claim 2, wherein light reflected by the upper reflector part creates a light distribution in which the light substantially condenses and illuminates directly ahead of a vehicle and light reflected by the lower reflector part creates a light distribution that illuminates lateral sides ahead of a vehicle.

5. Vehicular headlamp according to claim 2, wherein light reflected by the upper reflector part creates a light distribution in which the light substantially condenses and illuminates directly ahead of a vehicle and light reflected by the lower reflector part creates a light distribution that illuminates a shoulder or a centerline.

* * * * *